United States Patent [19]
Hunt

[11] 3,763,957
[45] Oct. 9, 1973

[54] GAS-CUSHION VEHICLE
[75] Inventor: Rowland Delville Hunt, Fareham, England
[73] Assignee: Vosper Thornycroft Limited
[22] Filed: July 22, 1971
[21] Appl. No.: 165,128

[30] Foreign Application Priority Data
July 28, 1970 Great Britain.................. 36,436/70

[52] U.S. Cl................................ 180/119, 301/5 R
[51] Int. Cl.............................................. B60v 3/00
[58] Field of Search.......................... 180/119, 116; 301/5 R; 152/5; 115/1

[56] References Cited
UNITED STATES PATENTS
3,251,430 5/1966 Veryzer............................ 180/119
3,398,713 8/1968 Hall............................... 180/119 X
3,246,712 4/1966 Mackie............................ 180/119
3,001,601 9/1961 Aghnides......................... 301/5 R

*Primary Examiner*—Kenneth H. Betts
*Attorney*—James E. Nolan et al.

[57] ABSTRACT

A gas-cushion vehicle having propulsion mechanism in the form of power driven hubs, each of which has radially extending members whose free ends successively drivably engage the surface over which the vehicle is travelling as said hub is rotated, said members being adapted to be deflected by the surface and/or irregularities in the surface.

7 Claims, 3 Drawing Figures

INVENTOR
ROWLAND DEVILLE HUNT
BY
ATTORNEY

GAS-CUSHION VEHICLE

BACKGROUND OF INVENTION

The invention relates to a gas-cushion vehicle, and more particularly to a gas-cushion vehicle for operating over water, ice, broken ice, soft mud, muskeg, tundra, and other difficult terrain.

SUMMARY OF INVENTION

The object of the invention is to provide a rugged and relatively cheap gas-cushion vehicle with the ability to negotiate gradients without an unduly high power requirement and without steering difficulties. These criteria rule out air propulsion.

According to the invention, a gas-cushion vehicle has propulsion means comprising at least one power driven rotatable hub provided with deflectable members projecting outwardly therefrom for making driving contact with the surface over which the vehicle is travelling.

BRIEF DESCRIPTION OF DRAWINGS

A preferred embodiment of the invention will now be described, by way of example only, with reference to the accompanying drawings of which.

DESCRIPTION OF PREFERRED EMBODIMENTS

Figure 1:
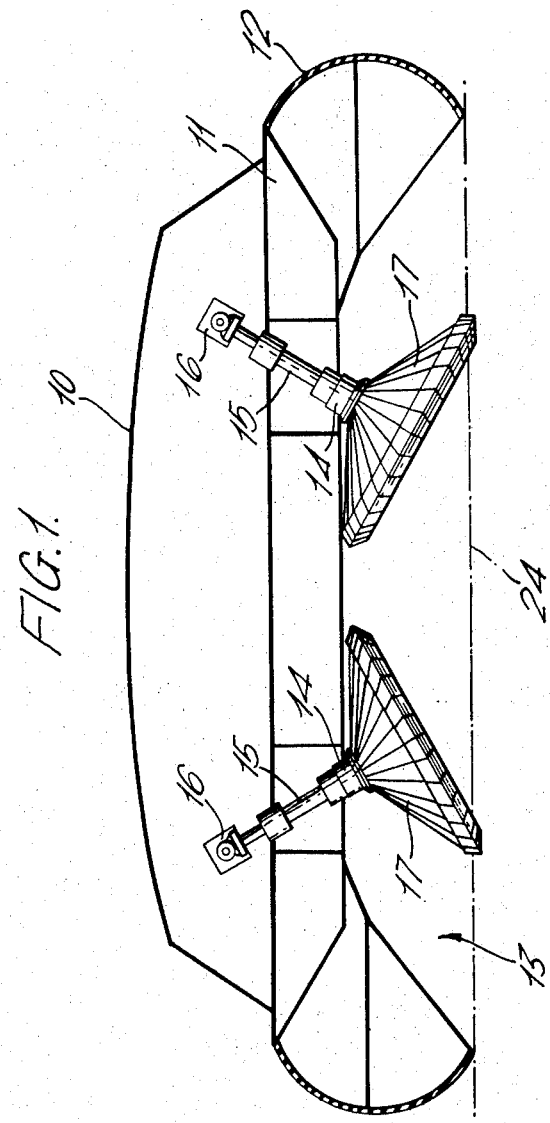
FIG. 1 is a diagrammatic partly sectioned end elevation of a gas-cushion vehicle.
Figure 2:
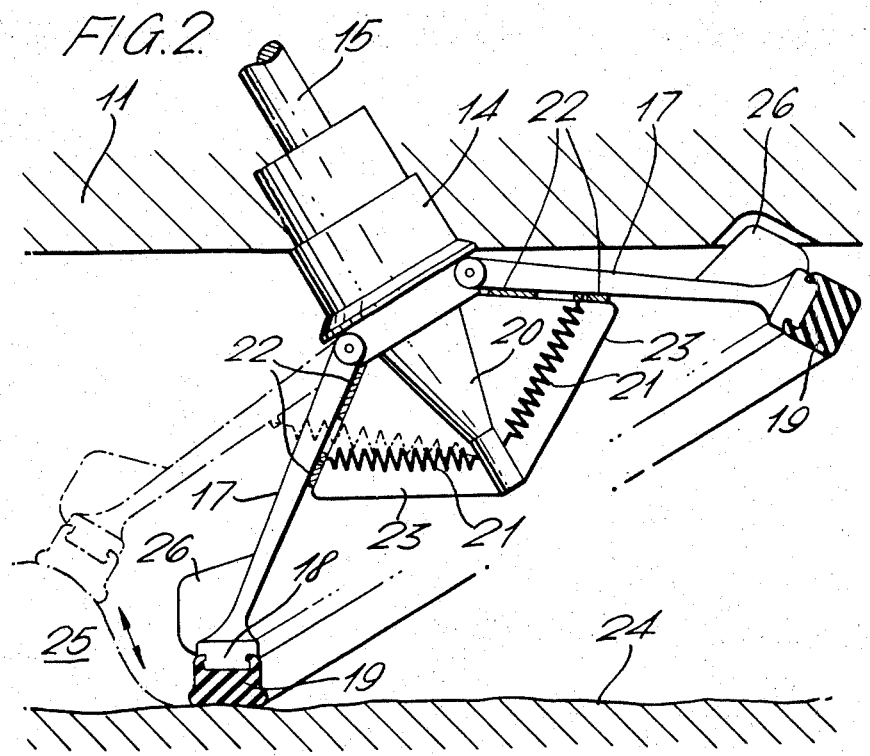
FIG. 2 is a sectional end elevation on a larger scale of a propulsion means in FIG. 1.

Referring to FIGS. 1 and 2 of the drawings, an amphibious air-cushion vehicle 10 comprises a payload-carrying horizontal platform 11 with a depending skirt 12 for containing a supporting air-cushion 13. Said cushion is supplied with air under pressure by a power-driven fan (not shown) on the vehicle 10. Located within the air-cushion space 13 are a plurality of pairs of laterally spaced power-driven rotatable hubs 14, the respective hubs 14 of each pair being located on opposite sides of the longitudinal centre-line of the vehicle 10 and the axis of each hub 14 being inclined upwardly and outwardly in a plane perpendicular to said centre-line. Each hub 14 is secured to the lower end of a drive-shaft 15, which is co-axial with its associated hub 14 and is rotatably supported in bearings (not shown) secured to the platform 11. The upper end of each drive-shaft 15 is connected via gearing 16 to an engine (not shown). Each of the hubs 14 has pivotally connected thereto, about respective tangential axes, the inner ends of a plurality of radially extending elongated members 17 formed of rigid material. The outer end of each of the elongated members 17 is enlarged to form a foot portion 18 to which is secured a flexible shoe 19. Each hub 14 has a downwardly extending conically shaped portion 20 which is connected to each member 17 by one of a plurality of tension springs 21. Each tension spring 21 urges its associated member 17 into contact with stops 22 mounted on one of a plurality of radially extending plates 23 secured to the portion 20 of the hub 14, causing the members 17 to take up a conical configuration. A generatrix of the curved surface of the imaginary cone which contains the members 17 lies in a horizontal plane so that the foot portions 18 and more particularly the flexible shoes 19 of the members 17 diametrically opposite said generatrix make driving contact with a surface 24 over which the vehicle 10 is travelling. Any irregularities 25 in the surface 24 deflect each member 17 against the action of its associated spring 21 to increase temporarily the angle between said member and the axis of rotation of the hub 14, indicated in broken lines in FIG. 2. The foot portion 18 of each of the members 17 has secured to it a vane 26 to assist in propelling the vehicle 10 over a liquid or soft surface.

Figure 3:
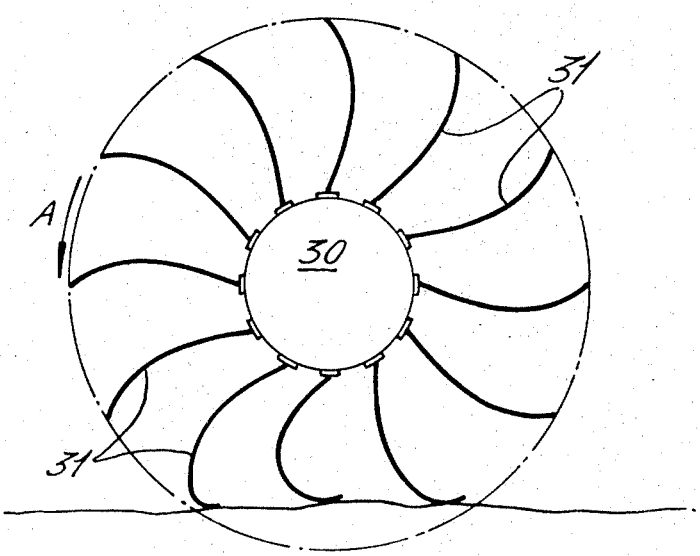
FIG. 3 is a side elevation of an alternative propulsion means.

Referring now to FIG. 3 of the drawings, in a modification at least one power driven rotatable hub 30 is located in the vehicle's cushion space with its axis of rotation horizontal. A plurality of elongated members 31 formed of resilient material are rigidly secured to the or each hub 30 so as to project outwardly therefrom. As the hub 30 rotates, in the direction shown by arrow A in FIG. 3, the members 31 make driving contact with the surface over which the vehicle is travelling and are deflected to a lesser or greater degree depending upon the smoothness or irregularity of said surface.

In another modification, the or each power driven rotatable hub 30, shown in FIG. 3 of the drawings, is located outside the vehicle's cushion space.

In a further modification, equally well applicable to the preferred embodiment of the invention or to the modifications thereof described in the two preceding paragraphs, the or each hub is urged downwards by resilient suspension means whose spring rate is adjustable by the operator according to the terrain being traversed.

What I claim is:

1. A gas-cushion vehicle having propulsion means comprising at least one pair of power-driven laterally-spaced hubs provided with deflectable members projecting outwardly therefrom for making driving contact with the surface over which the vehicle is travelling and wherein the axis of rotation of each hub is inclined in a vertical plane extending laterally of the vehicle, the members on each hub when undeflected lie on the curved surface of an imaginary cone, and a generatrix of said surface lies in a horizontal plane so that the free outer ends of those members diametrically opposite said generatrix make driving contact with the surface over which the vehicle is travelling.

2. A gas-cushion vehicle according to claim 1, wherein said generatrix is at the laterally inward side of the cone relative to the vehicle, the axis of rotation of each hub being inclined upwardly and outwardly relative to the longitudinal centre-line of the vehicle.

3. A gas-cushion vehicle according to claim 1, wherein each member is formed of rigid material; is pivotably connected about a tangential axis to the associated hub and urged into its undeflected position by resilient means; and is deflectable against the action of the resilient means, to increase the angle between it and the axis of rotation of the hub, by irregularities in the surface over which the vehicle is travelling.

4. A gas-cushion vehicle according to claim 2, wherein each member is formed of rigid material; is pivotably connected about a tangential axis to the associated hub and urged into its undeflected position by resilient means; and is deflectable against the action of the resilient means, to increase the angle between it and the axis of rotation of the hub, by irregularities in the surface over which the vehicle is travelling.

5. A gas-cushion vehicle according to claim 1, wherein the outer end of each member has a flexible shoe secured thereto.

6. A gas-cushion vehicle according to claim 1, wherein the outer end of each member has a vane secured thereto to assist in propelling the vehicle over a soft or liquid surface.

7. A gas-cushion vehicle according to claim 1, wherein resilient suspension means is provided between said hub and said members thereon.

* * * * *